United States Patent [19]

Meyer

[11] 3,975,008

[45] Aug. 17, 1976

[54] FRICTION-GRIP CLIP RELEASABLY ENCOMPASSES ROD

[75] Inventor: Engelbert A. Meyer, Union Lake, Mich.

[73] Assignee: USM Corporation, Boston, Mass.

[22] Filed: Aug. 14, 1975

[21] Appl. No.: 604,653

Related U.S. Application Data

[62] Division of Ser. No. 451,776, March 18, 1974, Pat. No. 3,910,627.

[52] U.S. Cl. ............................... 267/181; 403/372
[51] Int. Cl.² ............................................ F16F 1/00
[58] Field of Search ...................... 403/372; 267/181

[56] References Cited
UNITED STATES PATENTS 1,004,579   10/1911   Lawson .............................. 267/181
3,035,864   5/1962   Davidson ......................... 16/140 X

*Primary Examiner*—Wayne L. Shedd
*Attorney, Agent, or Firm*—Aubrey C. Brine; Vincent A. White; Richard B. Megley

[57] ABSTRACT

A visor blade of molded, collapsible truss formation is provided which features both safety and reliable position-holding capability. The latter is attained by a clip blanked from sheet metal and of a configuration to be anchored in a hinge portion of the visor, and tensionally grip a mounting rod to uniformly resist turning of the visor from any selected angular position about the rod.

4 Claims, 6 Drawing Figures

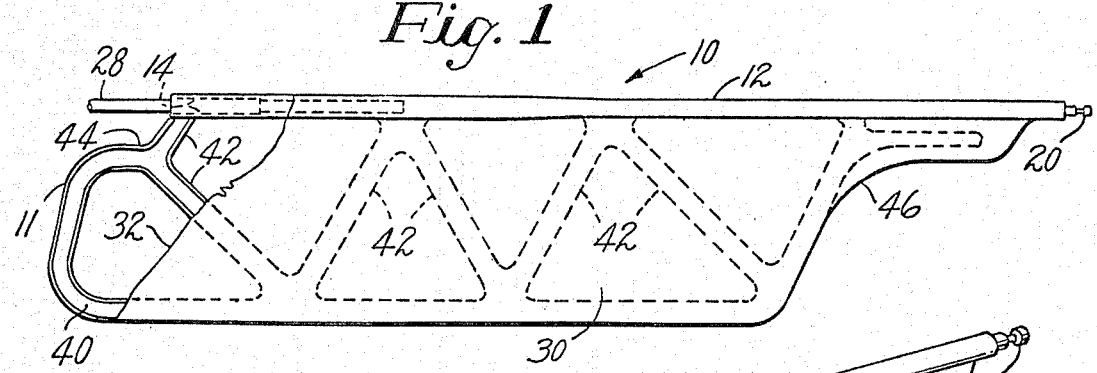
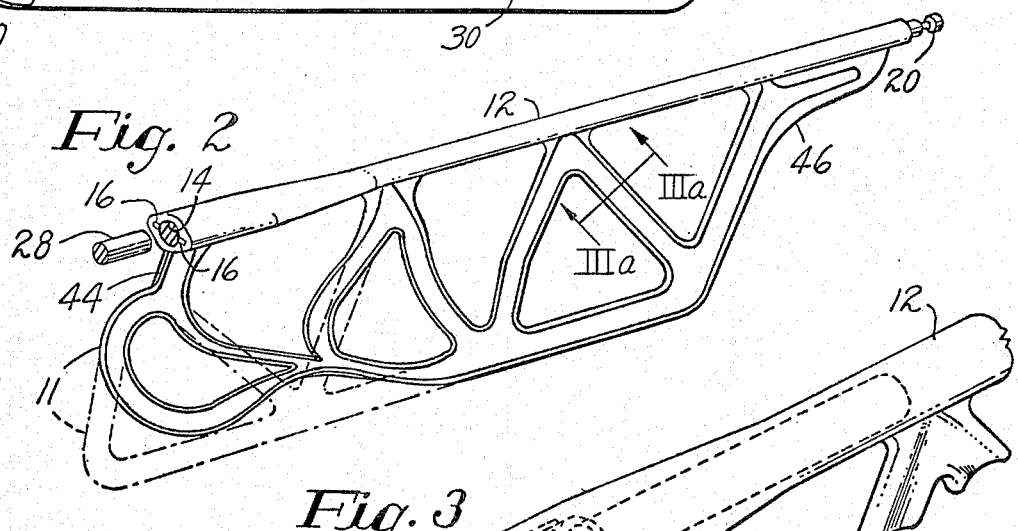
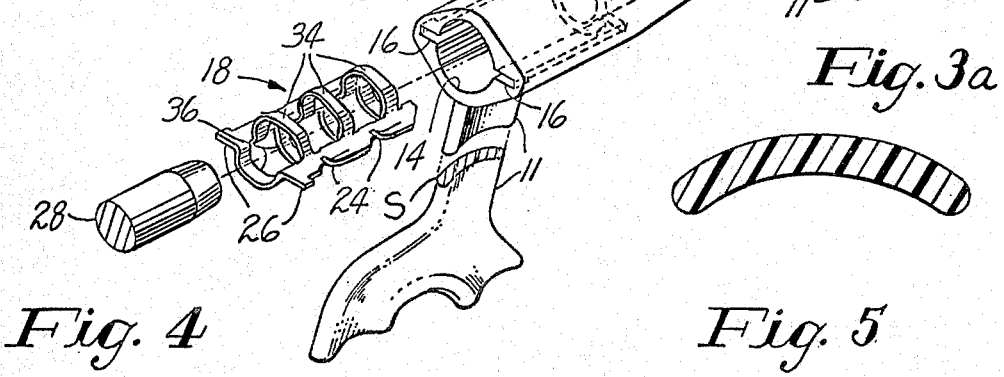
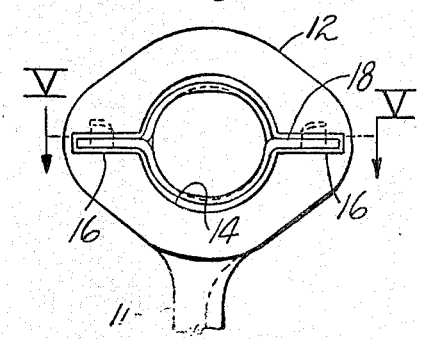
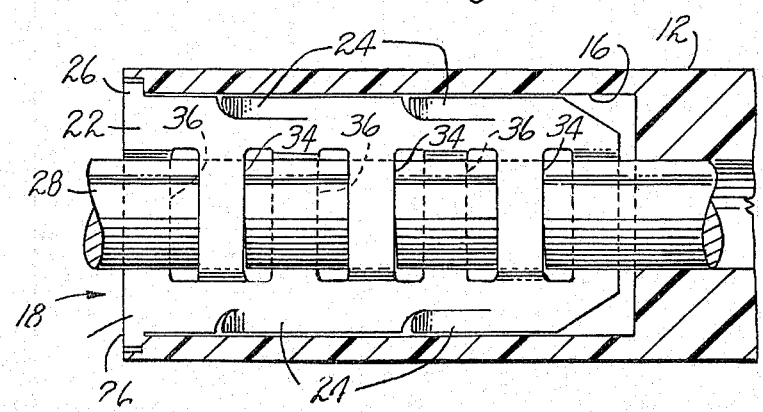

FRICTION-GRIP CLIP RELEASABLY ENCOMPASSES ROD

This is a division, of application Ser. No. 451,776, filed Mar. 18, 1974 now U.S. Pat. No. 3,910,627.

BACKGROUND OF THE INVENTION

This invention relates to vehicle visor assemblies.

Sun visors of the type generally installed in motor vehicles above windshields commonly have an annoying trait: they often fail to hold the selected position of adjustment to which they are swung for effectively blocking sun rays or the head beams of oncoming vehicles. Moreover, they may, after some usage, fail to stay in their normal out-of-the-way inoperative position and hence tend to obstruct vision or otherwise become a nuisance.

Visors have commonly comprised a flat portion or blade contoured to provide a movable mask, and a hinge portion extending along a longitudinal edge of the flat portion. One end of the hinge portion has ordinarily been formed to receive a pivotal carrier rod, and the other end adapted to be secured in latching position in front of and/or to one side of a vehicle occupant. Frequent and often sudden shifting of the blade, both angularly about the pivot axis at one end of the rod and about the longitudinal axis of the rod itself to meet changing circumstances tends to render the frictional operative holding relation of the carrying rod and the blade inconstant and unreliable.

A further disadvantage in vehicle visors is that, although their blade portions, often of laminar wood or cardboard, may be covered as by a flocculent or fabric, they are apt to be harmful in the event of vehicle accident since they may well be impacted by the heads of passengers and are inadequately yieldable to cushion a blow.

SUMMARY OF THE INVENTION

In view of the foregoing it is an object of this invention to provide an improved visor assembly mountable on a carrier rod and capable of frictionally retaining any adjusted position of angularity.

Another object of the invention is to provide an adjustable vehicle visor assembly, the molded blade of which is shaped to facilitate at least partial yielding or collapse in the event of an impact therewith, but which otherwise exhibits adequate resistance to deformation during manual operation thereof to overcome restraint maintaining the blade in a selected position.

To these ends, and as herein illustrated, a visor assembly comprises an integral, molded plastic body, including a substantially rigid hinge portion extending along one side thereof, one end of the hinge portion being axially tubular, and a sheet metal clip extending in the tubular hinge portion and having laterally projecting means engageable with the wall of said hinge portion to prevent relative rotation of the clip, the clip including axially spaced arcuate bearing bands, and a mounting rod arranged to be received in frictional engagement with the inner walls of the bands. Preferably, as shown herein the visor includes a planar blade portion extending along one side of the hinge portion, the blade portion being generally of parallelogram configuration and having an open or skeletal web-like frame structure consisting of angularly interconnecting members and an outer margin, the cross sections of which are concavo-convex. These molded lightweight members thus are individually bendable lengthwise but transversely rigid, and hence provide a unitary visor blade capable of buckling upon accidental impact.

BRIEF DESCRIPTION OF THE DRAWINGS

The foregoing and other features of the invention will now be more particularly described in connection with an illustrative embodiment and with reference to the accompanying drawings thereof, in which:

FIG. 1 is a view in side elevation of a sun visor assembly, its upper or hinge portion being horizontal and its blade portion being suspended therefrom and having its cover partly broken away to reveal its novel frame;

FIG. 2 is a perspective of the assembly shown in FIG. 1, without its cover, full lines now illustrating partial deformation resulting from an accidental impact;

FIG. 3 is an enlarged exploded perspective of a mounting end of the visor, configuration of a relaxed friction clip and FIG. 3a is a typical cross section of a blade member being shown;

FIG. 4 is an end view showing a mounting rod received in the installed friction clip, and FIG. 5 is an enlarged axial section showing mounting of the clip and rod.

DESCRIPTION OF THE PREFERRED EMBODIMENT

FIG. 1 shows a visor blade and clip assembly generally designated 10. It comprises a unitary frame 11 of plastic molded to provide a desired, for instance parallelogram, configuration. Along the longer, upper side of the assembly there extends a rigid hinge portion 12 (FIGS. 1–4) having at its tapering larger end an axial bore 14, preferably formed with opposed axial slots 16,16 (FIGS. 2,3) for a purpose later mentioned. The bore 14 is sized to receive and rotationally anchor a friction clip 18 (FIGS. 3–5) to be more fully described. The other end of the hinge portion 12 may be formed with a reduced socket 20 for releasably and pivotally securing the visor in a latch (not shown) mounted, for instance, above the windshield of a vehicle.

The clip 18 is preferably formed from a sheet metal blank of roughly about 0.020 inch gauge. Opposite margins 22,22 of the blank remain generally in a plane and are to be thrust axially into the slots 16,16 respectively. Tangs 24 (FIGS. 3–5) stuck from the margins 22 are provided to resist retraction of the clip from the bore 14. The margins 22 and end tabs 26,26 fitted in an end of the hinge portion thus prevent relative rotation of the clip in the visor when the latter is turned about its hinge axis, i.e. the axis of a cylindrical carrier or mounting rod 28 (FIGS. 3 and 5). This rod 28 has a leading end which may be beveled to be telescoped in the clip 18 as will be explained and an opposite end (not shown) is secured to a universal joint or other suitable means permitting the rod to be swung in such direction as it is desirable manually to orient the rod and the visor.

For enabling a planar blade portion 30 of the visor frame 11, which may be covered with fabric, plastic or other suitable soft material 32, to be swung about the axis of the carrier rod 28 and then held in any selected position, the clip 18 includes arcuate, substantially semi-elliptoidal bearing bands 34,36 (when relaxed as in FIG. 3) pressed from opposite sides of the original blank. These bands preferably are axially spaced uniformly and alternately project from opposite sides. Inner opposed minor radii of these relaxed bands 34,36 are slightly less than the radius of corresponding portions of the rod 28 and predetermined to provide tension when distended on the circumference of the rod 28. Their frictional gripping engagement therewith, in sum, consistently enables the visor portion to be angularly held as intended. Whereas prior designs have in time, through parts loosening or vibrations and the like, allowed a visor blade to fail to keep some angular settings and even to never retain other selected angular positions, the tensioning of the distended bands 34,36 engaging the rod 28 provides holding friction which is adequate and substantially uniform at all desired angular settings of the visor. Obviously fewer or more bands 34,36 may be employed as desired.

The planar blade portion 30 of the frame 11 desirably comprises, within the cover 32, a skeletal web-like structure of an outer margin 40 and interconnecting members 42. These are uniformly thin and lightweight, the member 42 intersecting near or substantially at the hinge portion 12 and at the opposite margin 40 of the parallelogram. As indicated at 44,46 (FIGS. 1,2) a "corner" portion may be cut away, in effect, to permit requisite clearance for a mirror or the like. Preferably for reinforcing purposes one of the members 42 terminates at a corner of the parallelogram. More particularly two or more of the members 42 are parallel and intersect at their junctions with the longer sides of the parallelogram at similar acute angles. To provide appropriate strength for rendering the visor repeatedly maneuverable and yet permit it to buckle on impact, each of the members 42 and the margin 40 has a shallow concavo-convex cross section as shown in FIG. 3; generally similar longitudinal shaped sections, though somewhat longer, are formed at the intersections of the members 40,42 and 12,42.

It will be appreciated from the foregoing that the invention provides a visor blade and clip assembly of simple structure which is relatively economical to manufacture. The clip 18 and unitary molded frame 11 when assembled are turned as one about the axis of the carrying rod 28 to position the visor blade portion 30 as desired. Frictional gripping of the distended bands 34,36 with the circumference of the rod 28 assures that all adjusted angular positions of the visor blade will be held. Moreover, yieldability in the concavo-convex shape of the visor blade web members 42 and of the margin 40 assures that accidental impact of the head for instance, of an occupant of the vehicle will collapse the visor at least partly and thereby assist in reducing and possibly avoiding serious injury.

Having thus described my invention, what is new and desired to be secured by Letters Patent of the United States is:

1. A sheet metal clip for frictionally retaining a cylindrical member comprising resilient relatively thin sheet metal members having a plurality of parallel slots formed therein from which a plurality of endless enclosed substantially semi-elliptoidal bearing bands are formed, said bands being axially spaced uniformly and alternately projecting from opposite sides of said member, the inner opposed minor radii of said bands in their relaxed condition, being of a predetermined dimension slightly less than that of corresponding portions of the cylindrical member to be retained, to provide tension in said bands when distended on the said member, thereby providing holding friction which is adequate to retain the member in the clip.

2. The clip of claim 1 which further includes marginal portions of said member extending from said bands and include means for attachment of said clips to adjacent structure.

3. The clip of claim 2 wherein said sheet metal member is substantially 0.020 inches in the thickness.

4. A clip as set forth in claim 1 wherein said bands, are distended within their elastic limits by the insertion of said member and are of substantially uniform size and shape.

* * * * *